Figure 4:
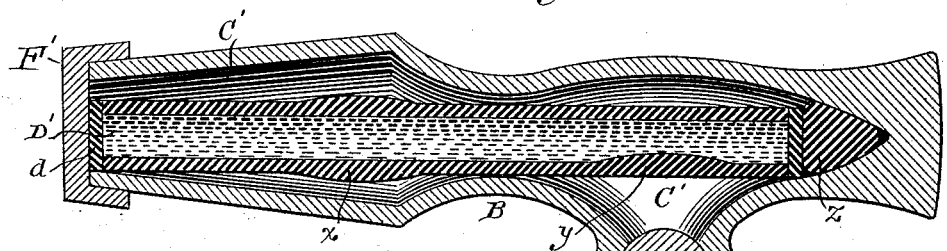

(No Model.) 2 Sheets—Sheet 1.
M. DITTENHOEFER.
ART OF LINING HOLLOW ARTICLES WITH HARD RUBBER.
No. 378,776. Patented Feb. 28, 1888.
Fig. 1.
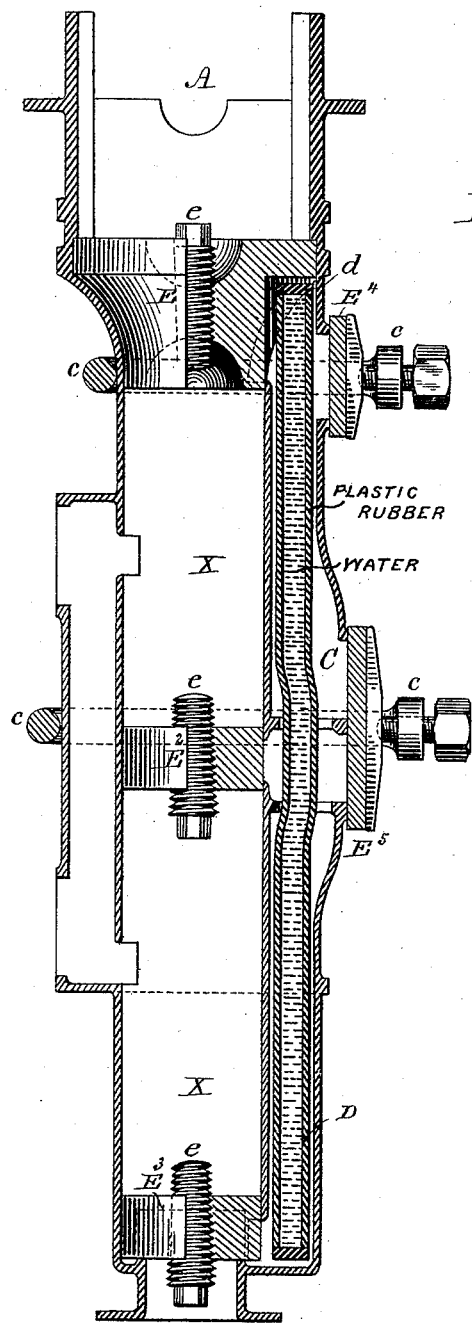
Fig. 2.
Fig. 3.
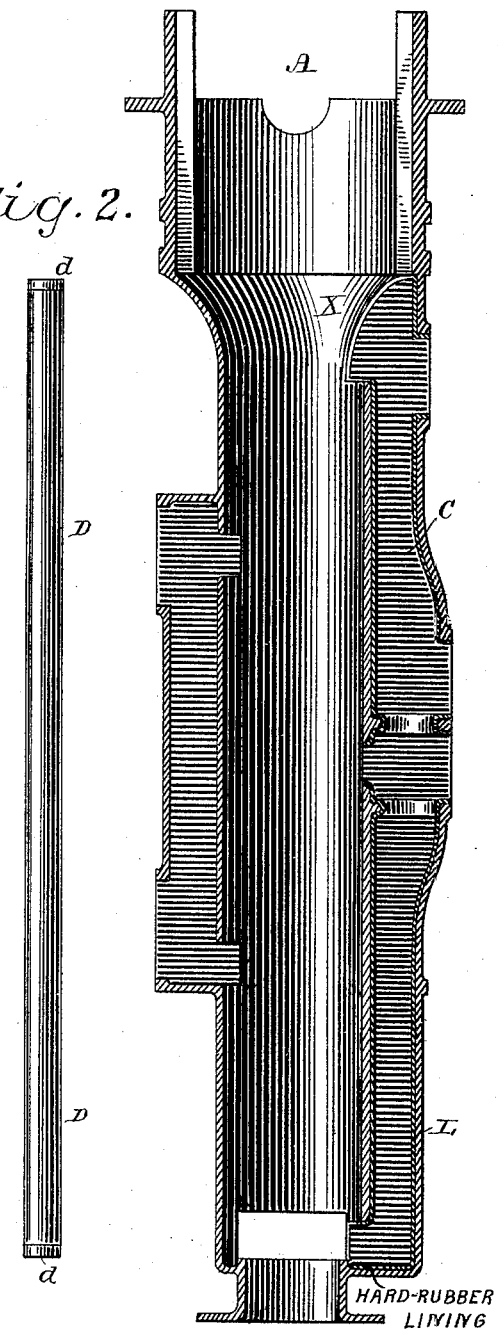
Witnesses.
H. C. Newman.
Ed. A. Newman.
Inventor.
MYER DITTENHOEFER,
By his Attorney (No Model.) 2 Sheets—Sheet 2.

M. DITTENHOEFER.
ART OF LINING HOLLOW ARTICLES WITH HARD RUBBER.

No. 378,776. Patented Feb. 28, 1888.

Witnesses.
H. C. Newman,
Ed. A. Newman,

Inventor.
MYER DITTENHOEFER,
By his Attorney,

UNITED STATES PATENT OFFICE.

MYER DITTENHOEFER, OF NEW YORK, N. Y.

ART OF LINING HOLLOW ARTICLES WITH HARD RUBBER.

SPECIFICATION forming part of Letters Patent No. 378,776, dated February 28, 1888.

Application filed November 4, 1887. Serial No. 254,313. (No model.)

*To all whom it may concern:*

Be it known that I, MYER DITTENHOEFER, a citizen of the United States, and a resident of New York, in the State of New York, have invented a new and useful Improvement in the Art of Lining Hollow Articles with Hard Rubber, of which the following is a specification.

The desirability of making articles and parts of articles of non-corrodible material, or coating them therewith, in order to prevent their destruction by oxidation or corrosion on the one hand, and on the other hand to prevent the vitiation or contamination of substances by contact with oxidizable metals, has long been recognized.

Hard rubber is universally admitted to be one of the very best acid-proof and innocuous materials for such purposes. It has heretofore been used only to a limited extent as a lining for hollow articles, being confined in its application to easily-accessible interiors. As thus applied, the plastic mass, preparatory to and during the vulcanizing operation, is pressed against and supported in contact with the surfaces which are to be coated by means of mandrels or plungers, which shape the chambers as found in the finished articles. Numerous hollow articles, however, with interiors which should be lined, but having contracted entrances and other contractions or otherwise irregular shapes, are incapable of being lined by any such process, and have never been provided with linings of hard rubber previous to my present invention, so far as I am informed.

This invention consists in a novel process, hereinafter set forth, whereby such hollow articles and hollow metallic articles in general of suitable sizes may be inexpensively lined with hard rubber. Such linings are applicable, for example, by the aid of this process, to "Navy pumps" and other hollow articles for use on shipboard to protect them against the deleterious action of sea-water and bilge-water; to chemical fire-extinguishers and other chemical apparatus, and to valves and nozzles used in connection therewith, to protect the same against corrosion, and to beer-pumps and fountains, soda and sirup fountains, metallic casks, and metallic faucets in general, to prevent the poisoning or vitiation of malt and spirituous liquors, and other liquids containing acids or other metal-attacking ingredients, by metallic salts.

Two sheets of drawings accompany this specification as part thereof.

Figure 5:
Figure 6:
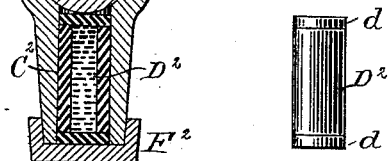
Figure 7:
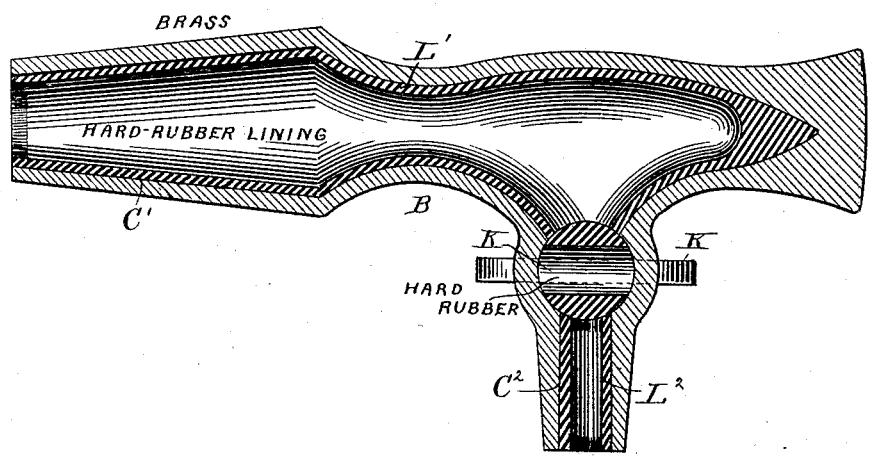

Figure 1 of the drawings represents a vertical section of the main casting of a Navy pump in process of being lined with hard rubber by my process. Fig. 2 is an elevation of the "tubular bag" of plastic rubber shown in Fig. 1. Fig. 3 represents a vertical section of the same casting with its lining finished. Fig. 4 represents a longitudinal section of a metallic faucet-body in process of being lined. Figs. 5 and 6 are elevations of the respective tubular bags shown in Fig. 4; and Fig. 7 represents a longitudinal section of the finished faucet.

Like letters of reference indicate corresponding parts in the several figures.

In carrying out this invention I take a given hollow metallic article, as a pump-casting, A, or a faucet-body, B, having one or more chambers, recesses, or bores, hereinafter termed "chambers," as $C$ $C'$ $C^2$, which are to be lined with hard-rubber by my process, and I roughly fit to each chamber a tubular bag, D, or D', or $D^2$, made of plastic rubber, with its ends hermetically closed, as by "buttons" or disks $d$, of the plastic rubber, and filled with water or any other material which at or below vulcanizing heat expands or generates a suitable vapor or gas of sufficient pressure, hereinafter termed the "inflating material."

I insert each tubular bag within the chamber to which it is fitted, and then tightly close the chamber, as by stoppers E $E^2$ $E^3$ $E^4$ $E^5$, Fig. 1, or by a plug, F, and caps $F'$ $F^2$, Fig. 4, all of which may be made of a relatively soft metal or alloy, and secured, if necessary, by suitable clamps, $c$, Fig. 1, or other fastenings, such as expanding-screws $e$, Fig. 1. The closed pump-casting, faucet-body, or whatever the article may be, is then introduced into the vulcanizing apparatus the same as an ordinary mold. When the whole becomes heated, the inflating material within the tubular bag or bags expands and presses the plastic rubber against the walls of the chamber or chambers within which they are inclosed, causing the rubber to conform itself to said walls, whether they be of regular or irregular shape, and to adhere or rest closely against the walls, so as to be supported by the latter and inseparably secured within the article. Finally, the plastic rubber becomes "vulcanized" and thus converted into hard rubber *in situ*. The vulcanizing apparatus is then opened, and after the articles have sufficiently cooled they are taken out and their plugs and caps are removed. A reaming-drill of suitable size is then run into the outer end or ends and other openings of each chamber to open the same and to remove any inequalities of surface in the contracted portions of the same; or this work may be done by other suitable tools. This completes the hard-rubber linings L L' L², Figs. 3 and 7, after which the article may be otherwise finished in customary manner. I prefer, however, in the case of faucets, to provide the same with a hard-rubber spigot or key, K, Fig. 7, to prevent any contamination of the liquid passing through the faucet at this point; and Navy-pumps and other pumping apparatus may preferably be provided with valve-seats and valves wholly of or coated with hard rubber.

In lining pumps, especially, there will be some chambers—as the pump cylinder X, Fig. 1—which can best be lined at a distinct operation by the same or the ordinary process; and in lining brass faucets, especially where the interior is very irregularly cored out to economize metal, an extra thickness of plastic rubber may be worked into the tubular bags, where the surface to be covered requires this, as illustrated at $x$ and $y$, Figs. 4 and 5, and the extremities of chambers into which the tubular bags cannot readily be fitted may be first filled by lumps of the plastic rubber, as represented at $z$, Fig. 4. By like adaptations within the scope of the skill of hard-rubber manufacturers the process may be applied to other hollow metallic articles in substantially the same way and so as to accomplish the aforesaid beneficial objects.

Other suitable materials adapted to be formed into tubular bags in plastic condition and to be expanded and hardened by heat and pressure may be employed as equivalents of "rubber" compounds; and the articles to be lined may be of any metal, as iron or copper, or of brass or any other alloy which will stand the vulcanizing heat.

I am aware that in producing certain hollow articles of hard rubber, water has been introduced and confined within them, so as to cause the rubber to be inflated and forced into the matrical recesses of the molds in the vulcanizing process, and also that such articles have been vulcanized under water with access of the water to the interior of the article. I am also aware that pipes or tubes have been lined with celluloid in peculiar apparatus by inserting a tube of celluloid, then heating and inflating it by steam or hot water introduced through one end of the tube, and finally cooling the pipe or tube to make the lining "set" or harden. The present invention has no reference whatever to the production of hollow articles of hard rubber or like material; but exclusively relates to lining hollow articles of metal with hard rubber or the like by the within-described process, the lining being vulcanized and finished *in situ*, where it remains to perform its peculiar functions; and my process differs, essentially, from said process of lining pipes or tubes with celluloid in the shaping of a vulcanizable compound in plastic condition into tubular bags, which are filled with inflating material and hermetically closed with the same or an analogous compound, so that the linings are conformed to the chambers to be lined by the expansion of said inflating material when the articles are subjected to vulcanizing heat.

I do not claim herein a hollow metallic article provided with a lining or linings of hard rubber or other analogous compound, as that is set forth in a previous application for patent filed by me September 30, 1887.

Having thus described my said improvement in the art of lining hollow articles with hard rubber, I claim as my invention and desire to patent under this specification—

The within-described process of lining a chamber or chambers in a hollow article with hard rubber or other vulcanizable compound, consisting in forming the compound while plastic into a tubular bag or bags, filling the same with an inflating material, as water, hermetically closing the bag or bags with the same or an analogous compound and inserting them into the chamber or chambers to be lined, tightly closing said chambers, subjecting the whole to vulcanizing heat, and vulcanizing and finishing the lining *in situ*, substantially as hereinbefore specified.

MYER DITTENHOEFER.

Witnesses:
JOHN S. GOLDSMITH,
I. M. DITTENHOEFER.